(No Model.)

M. MONEYMENT.
OPERA GLASSES.

No. 566,274. Patented Aug. 18, 1896.

WITNESSES:
Jos. A. Ryan
Chas. E. Brock

INVENTOR
Matthew Moneyment
BY
R. H. P. Lucey
ATTORNEY. S

UNITED STATES PATENT OFFICE.

MATTHEW MONEYMENT, OF PHILADELPHIA, PENNSYLVANIA, ASSIGNOR OF ONE-HALF TO JAMES P. KINKAID, OF SAME PLACE.

OPERA-GLASS.

SPECIFICATION forming part of Letters Patent No. 566,274, dated August 18, 1896.

Application filed October 25, 1895. Serial No. 566,916. (No model.)

*To all whom it may concern:*

Be it known that I, MATTHEW MONEYMENT, residing in West Philadelphia, in the county of Philadelphia and the State of Pennsylvania, have invented an Improvement in Opera-Glasses, of which the following is a specification.

The present invention relates to an improved combination of spectacles and opera-glasses; and it consists, essentially, of a lens-supporting case of light material attached to a spectacle-frame in a manner hereinafter fully described, and pointed out in the claim.

Figure 1:
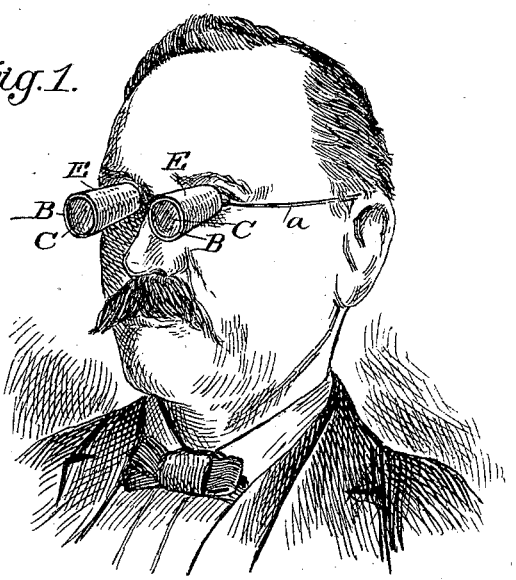
Figure 2:
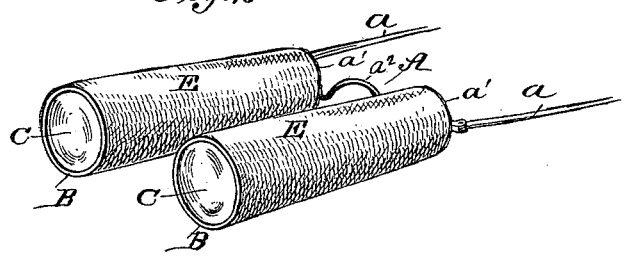
Figure 3:
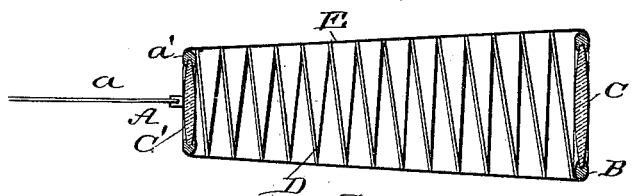
Figure 4:
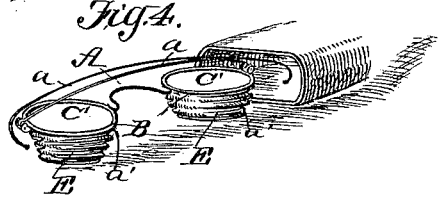

In the drawings forming a part of this specification, Figure 1 is a view showing my invention as applied and used. Fig. 2 is a detail view of the device ready for use. Fig. 3 is a sectional view, and Fig. 4 is a view showing the same folded.

In carrying out my invention I employ an ordinary spectacle-frame A, composed of the temples $a$, the rim $a'$, and the bridge $a^2$. To the rim $a'$, which contains the lens $C'$, is attached the lens-carrying portions B, which also has the lens C arranged therein, the same as in the ordinary opera-glass, the connections between each of the said outer lens-frames and the spectacle-frame consisting of a distending-spring enveloped in a flexible case. The lens-frames are held the desired distance apart by means of a light coiled spring D, inclosed in a flexible case E, composed of silk, leather, or other suitable material. By means of this construction the glasses are securely held to the eyes of the observer, and are so constructed that the outer lens-frames will always be maintained at the proper focal distance and do not require any focus-adjusting device, which, it will be seen, simplifies the construction. Another point of simplicity is the omission of any connections between the tubes except the spectacle-frame.

It will be readily seen that no adjustment whatever is necessary, as in manufacturing the glasses they will be graded according to the proper focal distance, so that each purchaser will obtain one to suit his or her eye, and after that no further adjustment will be necessary.

When not in use the flexible case can be compressed and placed in a case the same as an ordinary spectacle-case, thus occupying no additional room.

Having thus described my invention, what I claim, and desire to secure by Letters Patent, is—

The combination with the spectacle-frame and the lenses arranged therein, of the outer lens-frames and the lenses carried thereby, the sole connections between each of the said outer lens-frames and the spectacle-frame consisting of a distending-spring enveloped in a flexible case, the construction being such that the lenses assume their proper relative positions without the intervention of any focus-adjusting device, substantially as set forth and described.

In testimony whereof I affix my signature in the presence of two witnesses.

MATTHEW MONEYMENT.

Witnesses:
 DANL. F. MCCONNELL,
 AMBROSE HOSKINS.